United States Patent
Masao et al.

(10) Patent No.: US 7,293,062 B2
(45) Date of Patent: Nov. 6, 2007

(54) APPARATUS AND METHOD FOR COMMUNICATION CONTROL

(75) Inventors: Akimoto Masao, Tokyo (JP); Murata Matsutoshi, Tokyo (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 644 days.

(21) Appl. No.: 10/034,372

(22) Filed: Jan. 3, 2002

(65) Prior Publication Data

US 2003/0005063 A1    Jan. 2, 2003

(30) Foreign Application Priority Data

Jun. 28, 2001 (JP) .............................. 2001-197186

(51) Int. Cl.
*G06F 15/16* (2006.01)
*G06F 15/00* (2006.01)

(52) U.S. Cl. ................ 709/206; 709/230; 709/245; 709/246; 358/1.15

(58) Field of Classification Search ............. 709/206, 709/245–246, 230; 358/1.15
See application file for complete search history.

(56) References Cited

U.S. PATENT DOCUMENTS

| | | | | |
|---|---|---|---|---|
| 5,714,943 A | * | 2/1998 | Rasor | 340/7.1 |
| 5,864,676 A | * | 1/1999 | Beer et al. | 709/229 |
| 5,881,233 A | * | 3/1999 | Toyoda et al. | 709/233 |
| 5,987,609 A | * | 11/1999 | Hasebe | 726/35 |
| 6,065,048 A | * | 5/2000 | Higley | 709/218 |
| 6,175,823 B1 | * | 1/2001 | Van Dusen | 705/26 |
| 6,182,059 B1 | * | 1/2001 | Angotti et al. | 706/45 |
| 6,185,606 B1 | * | 2/2001 | Bereiter | 709/206 |
| 6,230,189 B1 | * | 5/2001 | Sato et al. | 709/206 |
| 6,237,040 B1 | * | 5/2001 | Tada | 709/246 |
| 6,266,160 B1 | | 7/2001 | Saito et al. | |
| 6,427,164 B1 | * | 7/2002 | Reilly | 709/206 |
| 6,542,936 B1 | * | 4/2003 | Mayle et al. | 709/250 |
| 6,654,779 B1 | * | 11/2003 | Tsuei | 718/101 |
| 6,681,246 B1 | * | 1/2004 | Dutta | 709/206 |
| 6,684,239 B1 | * | 1/2004 | Flepp et al. | 709/206 |
| 6,760,751 B1 | * | 7/2004 | Hachiya et al. | 709/206 |
| 6,836,792 B1 | * | 12/2004 | Chen | 709/220 |
| 6,883,014 B1 | * | 4/2005 | McErlean | 709/202 |
| 2002/0010746 A1 | * | 1/2002 | Jilk et al. | 709/206 |
| 2002/0177757 A1 | * | 11/2002 | Britton | 600/300 |

OTHER PUBLICATIONS

P. Mockapetris, RFC 1034—Domain names—concepts and facilities, Nov. 1987.*

* cited by examiner

*Primary Examiner*—Nathan Flynn
*Assistant Examiner*—Joshua Joo
(74) *Attorney, Agent, or Firm*—Greenblum & Bernstein, P.L.C.

(57) ABSTRACT

An internet facsimile apparatus (IFAX) can normally function even on a network managed by the HTTP protocol, in a system where an e-mail communicator receives e-mail from an IFAX according to the SMTP protocol, an HTML processor converts the e-mail data into an HTML data, an URL converter converts the destination address of the e-mail data into a URL format, and an HTML communicator transmits the HTML data to the converted URL according to the HTTP protocol.

3 Claims, 11 Drawing Sheets

Fig. 7

Header
```
HTTP/1.1 200 OK
Data : Fri, 23 Jun 2000 04:13:29 GMT
Server : hoge/1.0
Connection : close
Content-Type : text/html
```

HTML Document Data
```
<HTML>
<HEAD> <TITLE> TX sample </TITLE>
</HEAD>
<BODY BGCOLOR="#FFFFFFF">
<FORM ENCTYPE="multipart/fome-data" ACTION="upload.cgi" METHOD="post">
<TABLE>
<TR> <TD ALIGN=right> TO : </TD>
<TD> <INPUT TYPE="text" NAME="to" SIZE="60"> </TD>
</TR>
<TR> <TD ALIGN=right> Subject : </TD>
<TD> <INPUT TYPE="text" NAME="subject" SIZE="60"> </TD>
</TR>
<TR> <TD ALIGN=right> File Name : </TD>
<TD> <INPUT TYPE="file" NAME="file" SIZE="45"> </TD>
</TR>
</TABLE>
<P> <INPUT TYPE="submit" VALUE="SUBMIT">
</FORM>
</BODY>
</HTML>
```

Fig. 8

TO : 
Subject : 
File Name :  Reference...
SUBMIT

Fig. 10

| TO : | foo@hoge.co.jp | |
| --- | --- | --- |
| Subject : | test | |
| File Name : | D : ¥¥image tif | Reference... |

SUBMIT

APPARATUS AND METHOD FOR COMMUNICATION CONTROL

BACKGROUND OF THE INVENTION

1. Field of the Invention

This invention relates to a communication control method and apparatus that is connected to both a network managed by the HTTP protocol and an internet facsimile apparatus, and controls communication between both sides.

2. Description of Related Art

In the recent years, computer networks have been built to effectively share information using groupware software, in organizations such as corporations. Such networks (groupware networks) often incorporate internet technologies and employ groupware software available from WWW browsers. Thus, client terminals such as PC units on such a groupware network can share information on the groupware network by using the WWW browsers. The client terminals can therefore utilize functions such as e-mail and electronic bulletin boards.

On the other hand, facsimile apparatuses have been recently developed, which can transmit image information via internet, with operations similar to ordinary facsimile machines. These kinds of facsimile machines are called internet facsimile apparatuses (IFAX units), since they utilize internet for their entire/partial communication paths. Such an IFAX converts facsimile data into an e-mail format to transmit the data, when transmitting image information. When receiving image information, on the other hand, an IFAX converts the received e-mail data into a facsimile format, and performs a printing process. Such an IFAX controls e-mail data communication in accordance with protocol such as the SMTP (Simple Mail Transfer Protocol) and the POP3 (Post Office Protocol Version 3).

However, on the above-described groupware networks that use WWW browsers, all data is communicated in accordance with the HTTP protocol. Therefore, an IFAX that controls communication according to the SMTP and the POP3 cannot function on such a network.

SUMMARY OF THE INVENTION

This invention is provided in view of the above-described problems. The object of the present invention is to provide a communication control apparatus and method, with which IFAX units can normally function on networks managed by the HTTP protocol.

With the present invention, e-mail can be received according to the SMTP protocol between IFAX units, the e-mail data is converted into HTML data, the destination address of the e-mail data is converted into a URL format, and the HTML data is transmitted to the converted URL on the network by using the HTTP protocol.

Therefore, between the IFAX units, various signals and e-mail data are communicated according to the SMTP. On the network, however, various signals and e-mail data are communicated according to the HTTP protocol. Therefore, even on a network managed by the HTTP protocol, the IFAX units can normally transmit e-mail.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 7 shows source data of transmission form data that is transmitted to the communication control apparatus according to the embodiment of the present invention;

FIG. 8 is a conceptual rendering illustrating a transmission form that is transmitted to the communication control apparatus according to the embodiment of the present invention;

FIG. 10 is a conceptual rendering illustrating a transmission form that records transmission data sent from the communication control apparatus according to the embodiment of the present invention.

DETAILED DESCRIPTION OF PREFERRED EMBODIMENTS

The embodiment of the present invention is explained in the following, in reference to the above-described drawings.

Figure 1:
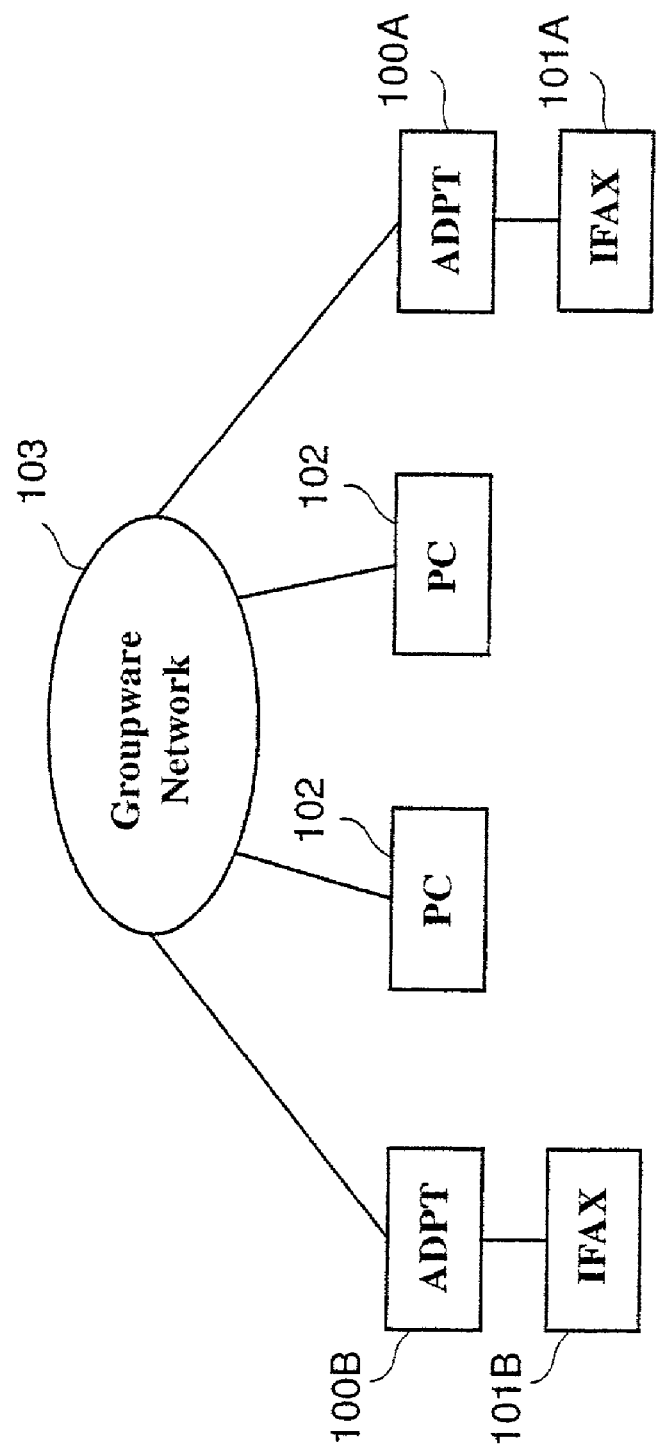
FIG. 1 is a conceptual rendering illustrating a network on which a communication control apparatus (ADPT) operates according to an embodiment of the present invention.

FIG. 1 is a conceptual rendering illustrating a network on which a communication control apparatus operates according to an embodiment of the present invention. A communication control apparatus 100 according to the embodiment of the present invention is connected to an IFAX 101, and functions as an adaptor to convert the communication protocol, when transmitting e-mail between the IFAX 101 and a connected network. Therefore, in the embodiment of the present invention, the communication control apparatus is called an adaptor (ADPT) in this embodiment.

An ADPT 100 connected to the IFAX 101 are also connected to a network 103, which is a LAN (Local Area Network) or the like, along with a communication terminal 102, which is a PC or the like. The network 103 is managed by a server that uses groupware software (groupware server). In this embodiment, the network 103 managed by the groupware server is called a groupware network 103.

This groupware server manages a network using the HTTP protocol, for example. Also, the groupware server functions as a WEB server, and by utilizing client terminals such as a PC 102 connected to the groupware network 103, or a WWW browser as an outer client terminal, the groupware server can provide information-sharing environment on the groupware network 103.

On the groupware network 103, when e-mail is communicated between the PC 102 units, the e-mail is transmitted in accordance with the HTTP protocol. When e-mail is communicated between the IFAX 101 units, e-mail needs to be transmitted in accordance with the HTTP protocol, as it is transmitted from the PC 102 units.

In this case of e-mail communication, the ADPT 100 units make adjustments between the HTTP protocol used to manage the network to which the IFAX 101 units are connected, and the SMTP protocol normally used to operate the IFAX 101 units.

Specifically, an ADPT 100A connected to an IFAX 101A of the sending side (ADPT of the sending side) receives e-mail data that is processed according to the SMTP protocol at the IFAX 101A of the sending side, and transmits the e-mail data to an ADPT 100B connected to an IFAX 101B of the receiving side (ADPT of the receiving side) according to the HTTP protocol that is used on the groupware network 103.

The ADPT 100B of the receiving side receives the e-mail data processed according to the HTTP protocol and forwards the e-mail data to the IFAX 101B of the receiving side, according to the SMTP protocol that is used by the IFAX 101B of the receiving side.

Thus, e-mail communication is performed between the IFAX 101 units that are connected to the groupware network 103, similar to processing normal e-mail communication.

Figure 2:
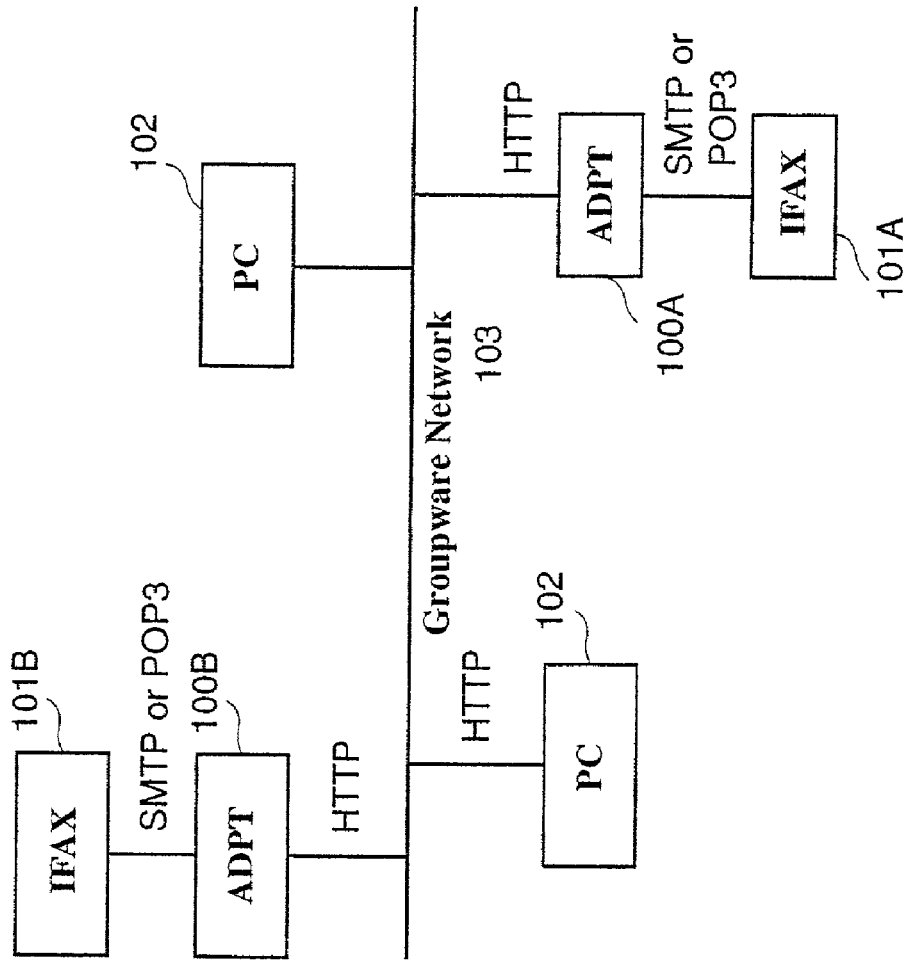
FIG. 2 is a conceptual rendering illustrating communication protocol used for performing e-mail communication on a network shown in FIG. 1.

FIG. 2 is a conceptual rendering illustrating communication protocol used for performing e-mail communication on a network shown in FIG. 1.

As described above, on the groupware network 103, e-mail data communication with the PC 102 or with the ADPT 100 is performed according to the HTTP protocol. Also, the e-mail data communication between the IFAX 101 and the ADPT 100 is performed according to the SMTP protocol (POP3).

Figure 3:
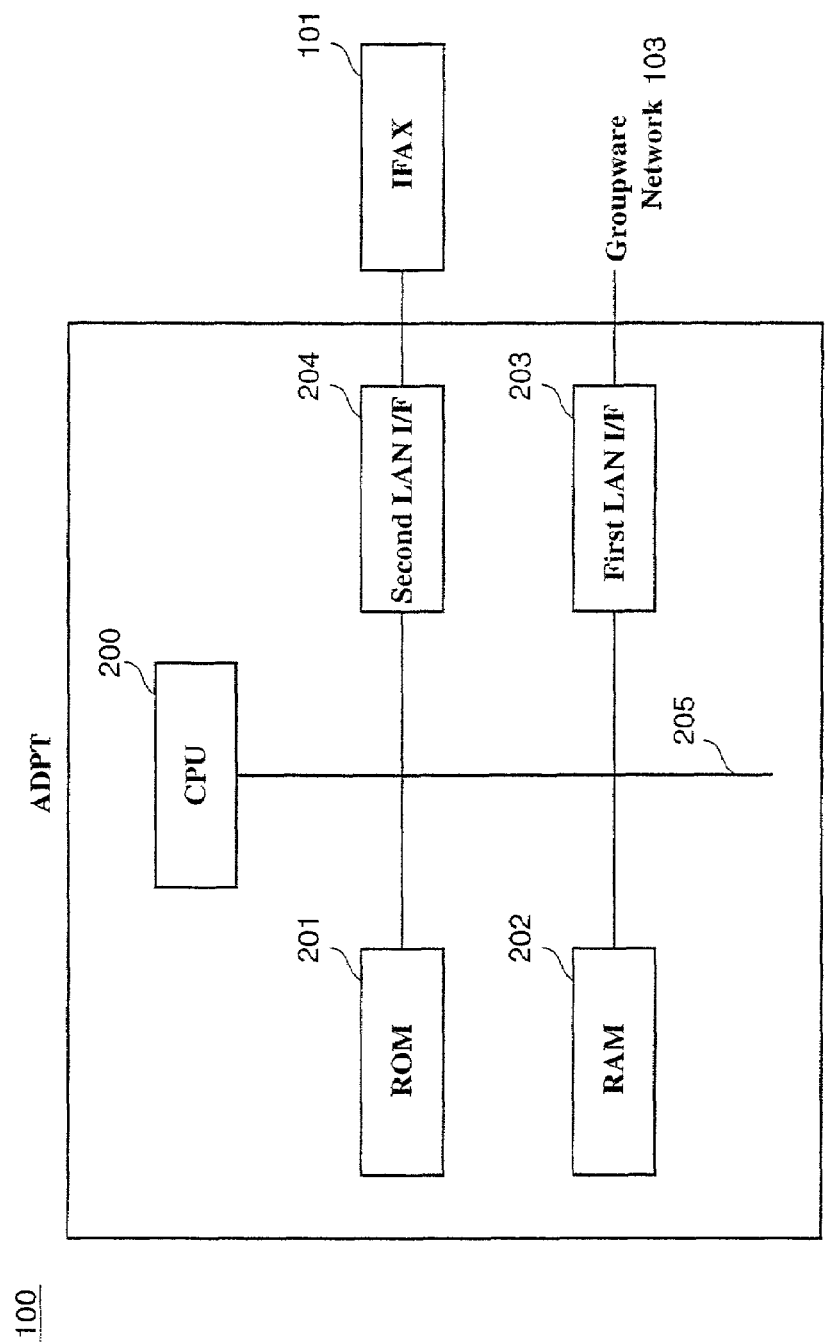
FIG. 3 is a block diagram illustrating a hardware structure of the communication control apparatus according to the embodiment of the present invention.

FIG. 3 is a block diagram illustrating a hardware structure of the ADPT 100 that functions as described above.

A central processing unit (CPU) 200 controls each section of the ADPT 100, by executing various programs. A ROM 201 stores programs that are executed by the CPU 200. A RAM 202 is used as a work area of the CPU 200 and as a memory to store predetermined data.

A first LAN interface (first LAN I/F) 203 is an interface that controls transmission/reception of various signals or data, with the groupware network 103.

A second LAN interface (second LAN I/F) 204 is an interface that controls transmission/reception of various signals or data, with the IFAX 101. Further, the second LAN I/F 204 is connected to any interfaces provided by the IFAX units, thus can be connected to any existing types of IFAX units without any restrictions to specifications of various units.

With the first LAN I/F 203 and the second LAN I/F 204, the ADPT 100 can operate between the IFAX 101 and the groupware network 103.

A bus 205 is a path in which data is forwarded within the CPU 200, ROM 201, first LAN I/F 203, and second LAN I/F 204.

Figure 4:
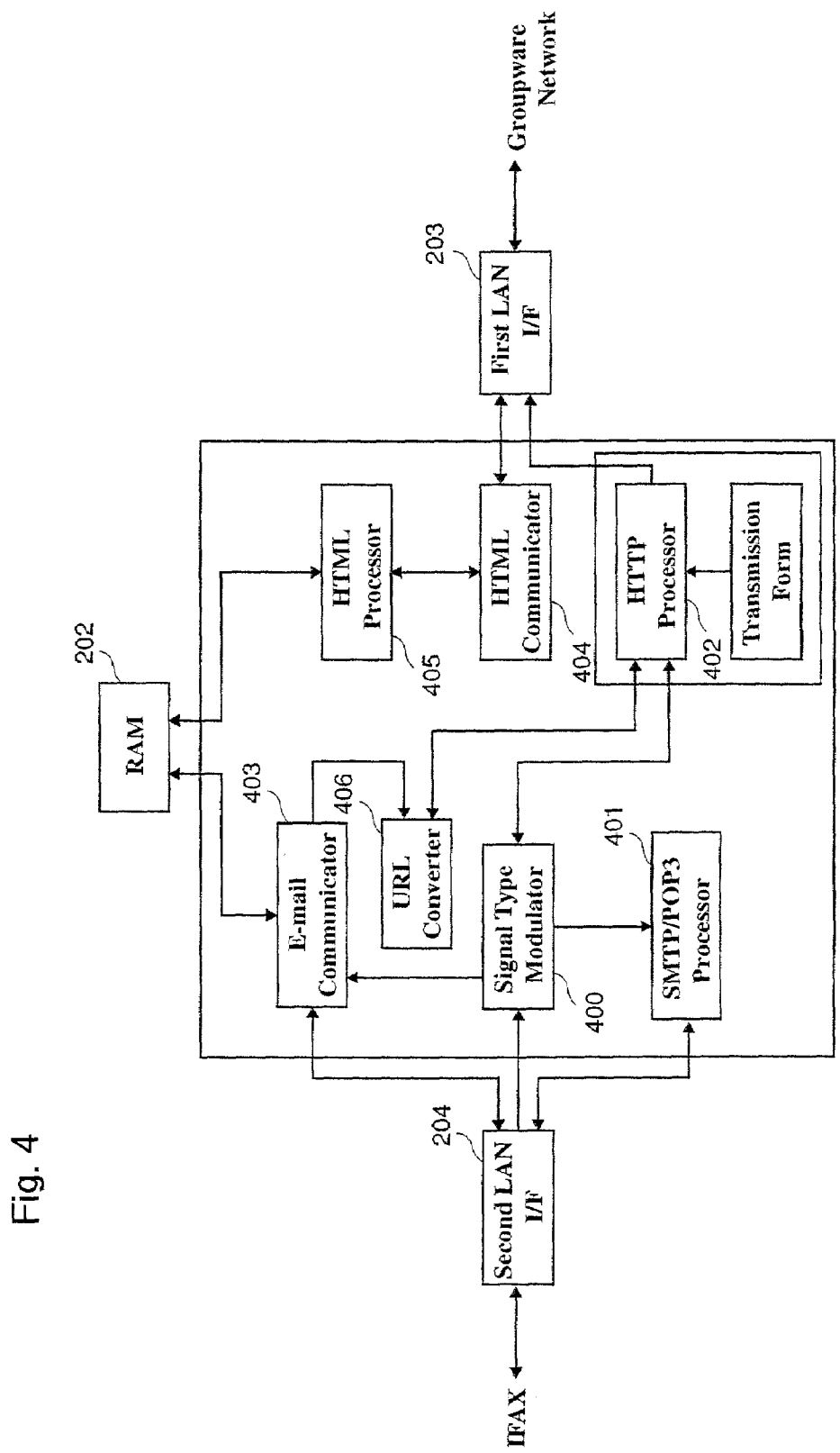
FIG. 4 is a block diagram illustrating primary functions of the communication control apparatus according to the embodiment of the present invention.

FIG. 4 is a block diagram illustrating primary functions of the ADPT 100 according to the embodiment of the present invention.

A signal type moderator 400 determines types of command signals that are output from the IFAX 101 via the second LAN I/F 204, and notifies an SMTP/POP3 processor 401, HTTP processor 402, and e-mail communicator 403 of receipt of command signals.

The SMTP/POP3 processor 401 performs communication of various command signals and data with the IFAX 101 via the second LAN I/F 204, in accordance with the SMTP protocol or POP3 protocol.

The HTTP processor 402 performs communication of various command signals and data with the groupware network 103 via the first LAN I/F 203, in accordance with the HTTP protocol.

The e-mail communicator 403 performs e-mail data communication with the IFAX 101 via the second LAN I/F 204. When the ADPT 100 is connected to the IFAX of the sending side, in other words, when the ADPT 100 receives e-mail from the IFAX according to the SMTP protocol, the e-mail communicator 403 stores the received e-mail data in the RAM 202. On the other hand, when the ADPT 100 is connected to the IFAX of the receiving side, in other words, when the ADPT 100 forwards the e-mail to the IFAX of the receiving side, the e-mail communicator 403 retrieves e-mail data that is stored in the RAM 202, and transmits the e-mail data to the IFAX of the receiving side via the second LAN I/F 204, according to the SMTP protocol.

When the ADPT 100 is connected to the IFAX of the sending side, a URL converter 406 converts the destination mail address, which is included in the e-mail data received by the e-mail communicator 403, into a URL data format in accordance with a predetermined format (later described). After the conversion, the URL data is delivered to the HTTP processor 402. When the ADPT 100 is connected to the IFAX of the receiving side, on the other hand, the ADPT 100 functions as an address converter and converts the URL data, which is designated by the communication terminal such as the destination IFAX, into a mail address format according to the predetermined format. The converted mail address is delivered to the e-mail communicator 403.

The HTML communicator 404 performs communication of HTML document data with the groupware network 103, via the first LAN I/F 203. When the ADPT 100 is connected to the IFAX of the sending side, the HTML document data that is received from the later described HTML processor 405, is transmitted to the groupware network 103 via the first LAN I/F 203, according to the HTTP protocol. When the ADPT 100 is connected to the IFAX of the receiving side, on the other hand, the ADPT 100 receives the HTML document data from the groupware network 103 via the first LAN I/F 203, according to the HTTP protocol. Then, the HTML document data is delivered to the HTML processor 405.

When the ADPT 100 is connected to the IFAX of the sending side, the HTML processor 405 functions as an HTML converter, and executes a process to convert the e-mail data that is stored in the RAM 202 into HTML document data. When the ADPT 100 is connected to the IFAX of the receiving side, on the other hand, the HTML processor 405 functions as an e-mail data converter, executes a process to convert HTML document data that is received by the HTML communicator 404 into e-mail data, and stores the data in the RAM 202.

Figure 5:
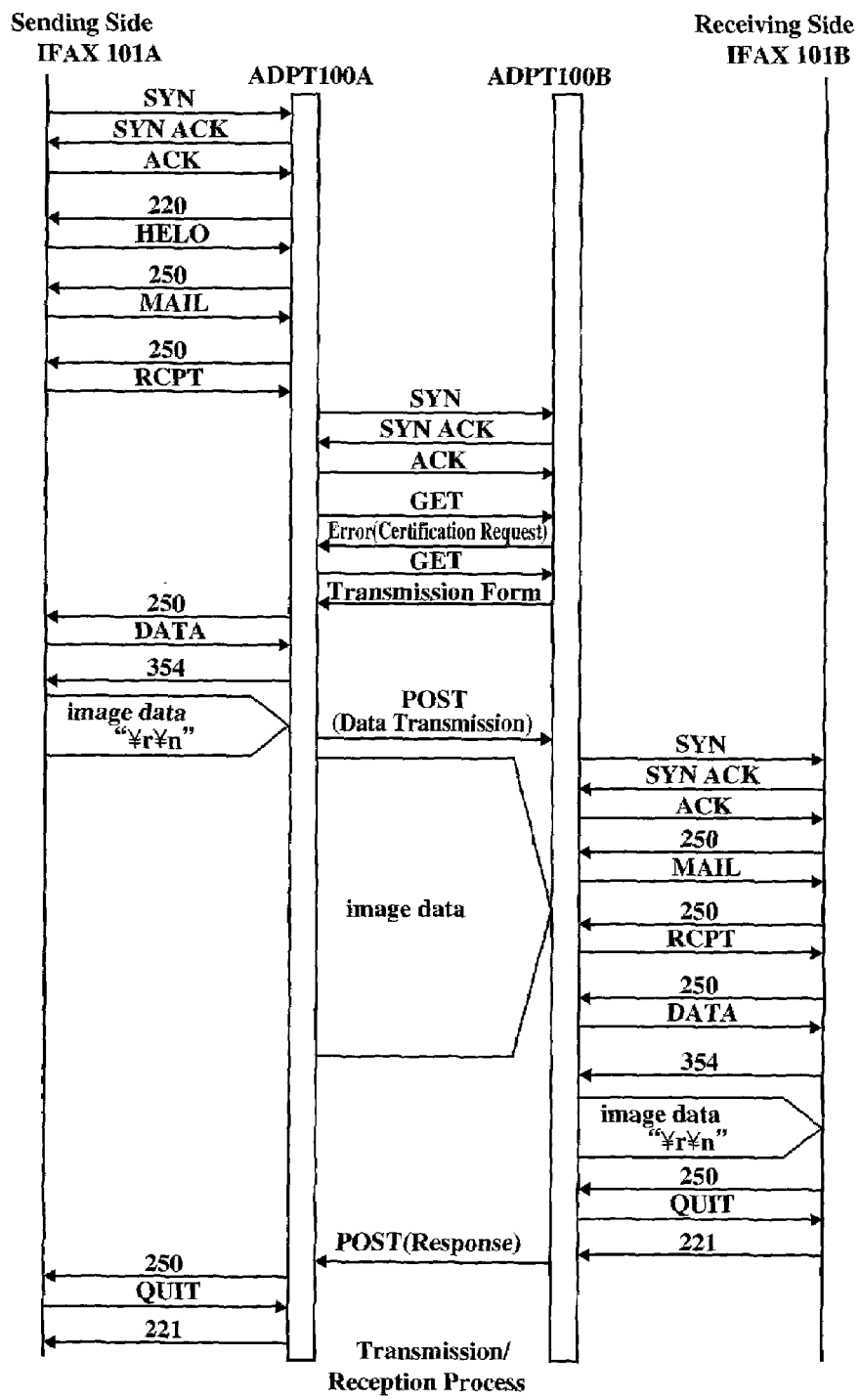
FIG. 5 is a sequence chart illustrating a situation when e-mail is transmitted from an IFAX of a sending side to an IFAX of a receiving side, to both of which the communication control apparatuses are connected, according to the embodiment of the present invention.
Figure 6:
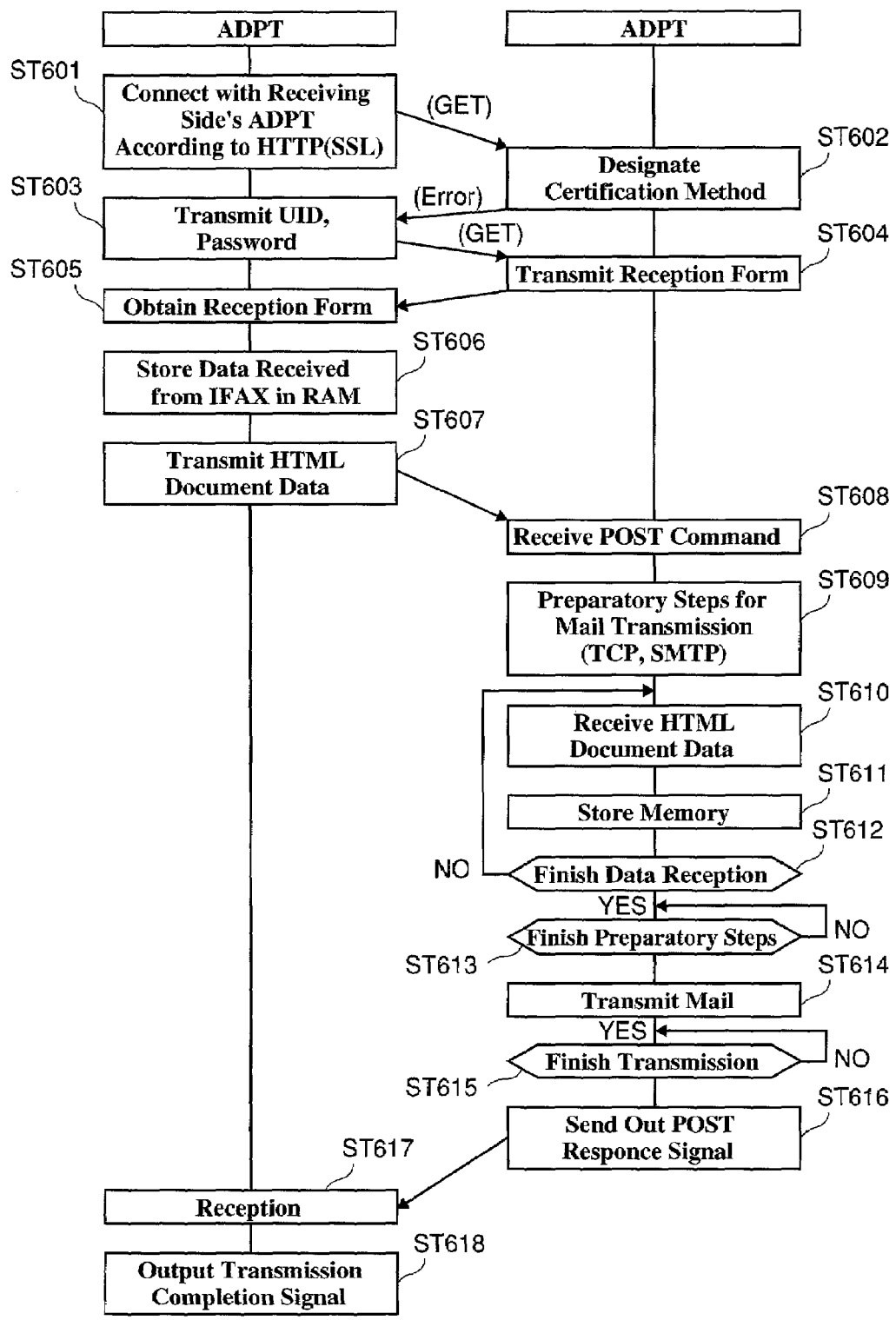
FIG. 6 is a flowchart illustrating a situation when e-mail data is transmitted from the communication control apparatus of the sending side to the communication control apparatus of the receiving side, according to the embodiment of the present invention.

Next, a process for transmitting e-mail from the IFAX 101A of the sending side to which the ADPT 100A of the above structure is connected, to the IFAX 101B of the receiving side on the groupware network 103, is illustrated using a sequence chart of FIG. 5 and a flowchart of FIG. 6.

FIG. 5 is a sequence chart illustrating a situation when e-mail is transmitted from the IFAX 101A of the sending side to which the ADPT 100A is connected, to the IFAX 101B of a receiving side, according to the embodiment of the present invention. FIG. 6 is a flowchart illustrating a situation when e-mail data is transmitted from the ADPT 100A of the sending side to the ADPT 100B of the receiving side.

When transmitting e-mail from the IFAX 101A of the sending side to the IFAX 101B of the receiving side, the IFAX 101A first executes steps for establishing a connection with the ADPT 100A.

As shown in FIG. 5, the IFAX 101A transmits a command signal (SYN) to the ADPT 100A for synchronization. Upon receiving a command signal (SYN ACK) to acknowledge the synchronization, which is transmitted from the ADPT 100A in response to the command signal (SYN), the IFAX 101A transmits a command signal (ACK) to acknowledge the receipt of the command signal (SYN ACK). By executing these steps, a connection is established between the IFAX 101A and the ADPT 100A.

After the connection is established between the IFAX 101A and the ADPT 100A, the SMTP/POP3 processor 401 at the ADPT 100A starts an exchange of command signals with the IFAX 101A, according to the SMTP protocol.

Specifically, the SMTP/POP3 processor 401 first outputs a response signal (220) that indicates an OK sign for reception toward the IFAX 101A. Upon receiving this "220", the IFAX 101 A outputs a command signal (HELO) toward the ADPT 100A, to announce the beginning of the communication path usage.

Upon receiving this "HELO", the signal type moderator 400 at the ADPT 100A notifies the SMTP/POP3 processor 401 of the receipt of the same. Upon receiving this notification, the SMTP/POP3 processor 401 further outputs a response signal (250) that indicates an OK sign for reception toward the IFAX 101A.

Further, upon receiving command signals that are output from the IFAX 101A: (MAIL) for the sender name of the message; (RCPT) for the destination name of the message; and (DATA) for the beginning of the message transmission, the SMTP/POP3 processor 401 outputs response signals: "250"; "250"; and "354" to each command signal respectively. The response signal "250" in response to "RCPT" is output toward the IFAX 101A upon receiving a transmission form from the ADPT 100B of the receiving side (later described).

After outputting "354", the ADPT 100A receives a command signal (QUIT) to announce a completion of the usage of the communication path and the e-mail data, which is output from the IFAX 101A of the sending side. The SMTP/POP3 processor 401 outputs "250" when completing the reception of e-mail data and "221" in response to "QUIT" to the IFAX 101A of the sending side. Accordingly, the connection between the IFAX 101A and the ADPT 100A is terminated. Further, "250", which is output at the completion of the e-mail data reception, is output to the IFAX 101A, upon receiving "POST" as a response signal from the IFAX 101B.

On the other hand, the ADPT 100A, upon receiving "RCPT" from the IFAX 101A, executes steps to establish a connection with the ADPT 100B. Specifically, the ADPT 100A converts the message destination (e-mail address) included in "RCPT" into a URL data format by a predetermined format at the URL converter 406, and delivers the URL data to the HTTP processor 402. The HTTP processor 402 accesses the URL data and transmits a command signal (SYN) for synchronization. The ADPT 100A, upon receiving a command signal (SYN ACK) to acknowledge the synchronization, which is transmitted from the ADPT 100B in response to the command signal (SYN), transmits a command signal (ACK) to acknowledge the receipt of the command signal (SYN ACK). By executing these steps, the connection is established between the ADPT 100A and the ADPT 100B.

After confirming the connection established between the ADPT 100A and the ADPT 100B, the HTTP processor 402 starts an exchange of command signals at the ADPT 100A with the ADPT 100B, according to the HTTP protocol.

Specifically, the HTTP processor 402 outputs a command signal (GET) that requests for a connection toward the ADPT 100B. Accordingly, the ADPT 100A is connected to the ADPT 100B according to HTTP protocol, as shown in FIG. 6 (ST601).

Here, the connection is made merely according to the HTTP protocol, however, it is preferable to apply technology such as SSL (Secure Socket Layer) and protect the security of the data that is exchanged with the ADPT 100B in the embodiment of the invention.

Upon receiving the above "GET", the HTTP processor 402 and the HTML communicator 404 at the ADPT 100B output an error signal including a certification request as a response signal, to the ADPT 100A. This error signal is structured with a header and HTML document data, which designates a certification method. Accordingly, the ADPT 100B designates a certification method (ST602).

Upon receiving the error signal, the HTTP processor 402 and the HTML communicator 404 at the ADPT 100A transmit a command signal (GET) that requests a transmission form, by attaching a pre-configured user ID (UID) and a password (ST603).

Upon receiving the above "GET", the HTTP processor 402 and the HTML communicator 404 at the ADPT 100B determine whether the UID and the password attached to "GET" are correct. If they are correct, data including the transmission form ("transmission form data") is output toward the ADPT 100A (ST604).

Figure 8:
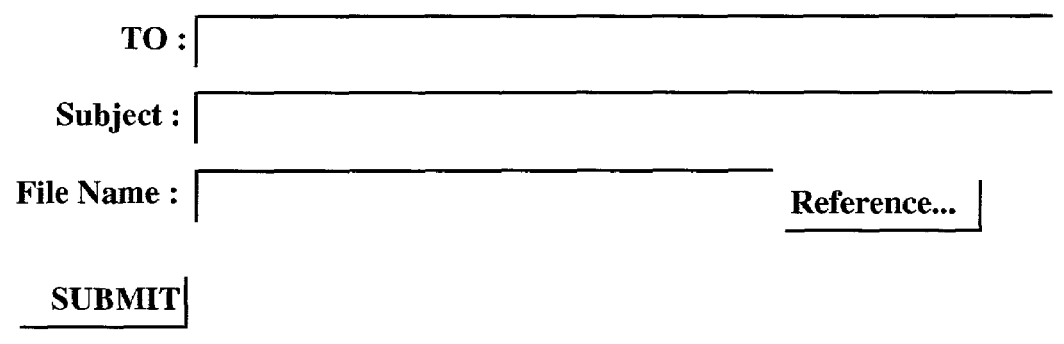

FIG. 7 shows source data of transmission form data that is transmitted from the ADPT 100B. As shown in FIG. 7, the transmission form data is structured with a header and HTML document data, which includes a transmission form. By receiving this transmission form, the ADPT 100A can recognize the transmission form as shown in FIG. 8. FIG. 8 is a conceptual rendering illustrating a transmission form that is transmitted from the ADPT 100B.

Upon receiving the transmission form data, the HTML communicator 404 at the ADPT 100A extracts the HTML document data from the transmission form data, and obtains the transmission form (ST605). Then, the HTTP processor 402 notifies the signal type moderator 400 of the receipt of the transmission form data.

Upon receiving the notification of receiving the transmission form data, the signal type moderator 400 notifies the SMTP/POP3 processor 401. Upon receiving this notification, the SMTP/POP3 processor 401 transmits response signals, "250" and "354", in response to "RCPT", to the IFAX 101A as described above, and requests transmission of the e-mail data from the IFAX 101A. Further, the e-mail communicator 403 receives the e-mail data that is transmitted from the IFAX 101A, and stores the data in the RAM 202 (ST606).

The HTML processor 405 extracts a title ("Subject" in FIG. 8) and a file name ("File Name" in FIG. 8) from the e-mail data stored in the RAM 202, and inserts the information in the predetermined positions of the transmission form.

The transmission form with the necessary information is delivered to the HTML communicator 404, and the HTML communicator 404 transmits a command signal (POST) including the transmission form to the ADPT 100B.

Then, the HTML communicator 404 receives the HTML document data that is converted from the e-mail data by the HTML processor 405, and transmits the converted HTML document data to the ADPT 100B (ST607).

Figure 9:
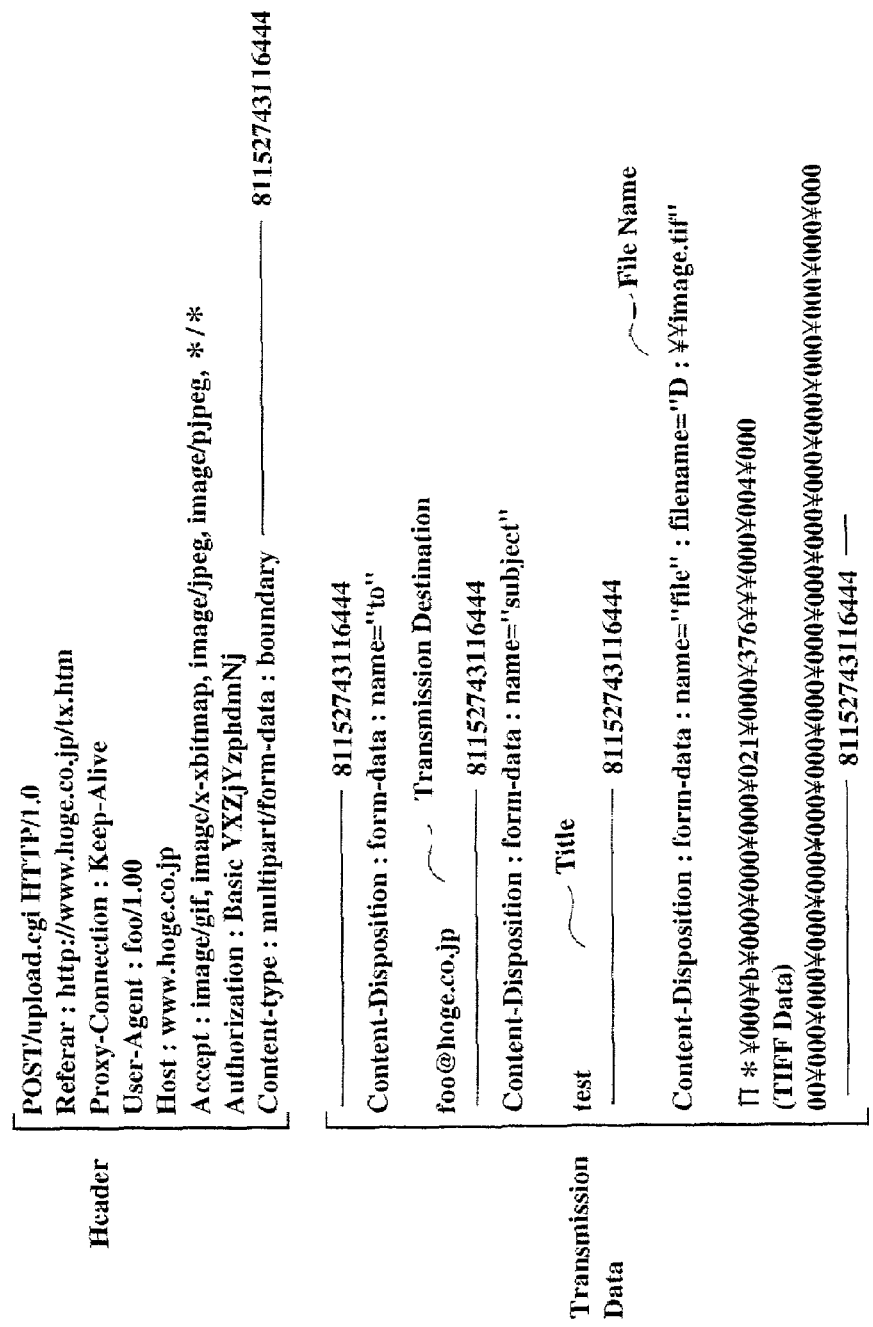
FIG. 9 shows source data of "POST" that is transmitted by the communication control apparatus according to the embodiment of the present invention.

FIG. 9 shows source data of "POST" that is transmitted by the HTML communicator 404. As shown in FIG. 9, "POST" is structured with a header and transmission data, which includes necessary information to be inserted in the above-described transmission form.

As shown in FIG. 9, a title (test) and a file name (¥¥image.tif) are recorded in the transmission data. By receiving the "POST", the ADPT 100B can recognize the transmission form with the necessary information shown in FIG. 10. FIG. 10 is a conceptual rendering illustrating a transmission form that records transmission data sent from the ADPT 100A.

Also, as shown in FIG. 9, it is preferable in the embodiment to list the information regarding the message destination included in "RCPT" (e.g., foo@hoge.co.jp) in the transmission destination. In other words, by using the ADPT 100 of the embodiment of the present invention, the communication is performed according to the HTTP protocol. Therefore, data that is usually transmitted to the other side when using the SMTP protocol can be missed. However, by listing the information regarding the message destination in the transmission destination, and by restoring the information at the receiving side, it is possible to prevent missing data as described above.

Here, the predetermined format with which the URL converter 406 converts the mail address into the URL data is explained. For example, the IFAX 101A of the sending side transmits e-mail data to "foo@hoge.co.jp" of the mail address of the receiving side's IFAX 101B.

When receiving the e-mail data addressed to the mail address, the URL converter 406 uses the user name and the domain name of the mail address, and converts the data into URL data "http://foo.hoge.co.jp/".

Further, when the ADPT 100 becomes the ADPT 100B of the receiving side, on the other hand, the URL converter 406 converts the URL data into a mail address according to the above format. Specifically, the URL data of "http://foo.hoge.co.jp/" is converted into a mail address of "foo@hoge.co.jp".

Upon receiving the above "POST" (ST608), the HTTP processor 402 at the ADPT 100B notifies the signal type moderator 400. Upon receiving the notification of receiving "POST", the signal type moderator 400 notifies the SMTP/POP3 processor 401.

The above "POST" includes information on the image data size, which is to be received in the future. The information on the image data size is stored in the RAM 202. The HTTP processor 402 delivers the URL data, which is written in the transmission destination of the transmission form included in "POST", to the URL converter 406. When receiving the URL data, the URL converter 406 converts the URL data into a mail address according to the above-described predetermined format, and delivers the mail address to the e-mail communicator 403. The e-mail communicator 403 keeps the mail address.

When receiving the notice of the receipt of "POST" from the signal type moderator 400, the SMTP/POP3 processor 401, on the other hand, executes the steps to establish a connection (preparatory steps for e-mail transmission) with the IFAX 101B (ST609). Specifically, the ADPT 100B executes the same steps as the IFAX 101A and the ADPT 100A have executed. By executing the steps, a connection is established between the ADPT 100B and the IFAX 101B.

After the connection is established, the IFAX 101B outputs a response signal "250" to indicate an OK sign for the reception, and the ADPT 100B transmits command signals: (MAIL) for the sender name of the message; (RCPT) for the destination name of the message; and (DATA) for the start of the message transmission. Also, the ADPT 100B receives response signals: "250"; "250"; and "354" in response to each of the command signal respectively from the IFAX 101B.

Parallel to the above preparatory steps for the e-mail, the HTML communicator 404 at the ADPT 100B receives the HTML document data transmitted from the ADPT 100A at ST607 (ST610). The received HTML document data is converted into an e-mail data format by the HTML processor 405, and stored in the RAM 202 (ST611).

By referring to the information on the image data size that is already stored in the RAM 202, whether the HTML document data reception is complete is checked (ST612). If the reception is complete, the control waits for the completion of the preparatory steps for the e-mail (ST613). The preparatory steps for the e-mail is considered complete, when the IFAX 101 B of the receiving side outputs a response signal "250" in response to a command signal "RCPT".

When the preparatory steps for the e-mail is complete, the SMTP/POP3 processor 401 transmits a command signal "DATA" to the IFAX 101B of the receiving side. Upon receiving "354" as a response signal from the IFAX 101B, the e-mail communicator 403 retrieves the e-mail data that is received from the ADPT 100A and stored in the RAM 202, and transmits the data to the IFAX 101B (ST614). At this time, the e-mail communicator 403 designates the mail address that is received from the URL converter 406 as a transmission destination, and transmits the e-mail data.

Upon receiving a response signal "250" for a completion of the e-mail data reception from the IFAX 101B, the SMTP/POP3 processor 401 transmits a command signal (QUIT) to announce a completion of the communication path usage, to the IFAX 101B.

Upon receiving a response signal "211" in response to "QUIT" from the IFAX 101B, the control recognizes the completion of the e-mail data transmission (ST615). With "212", the connection between the IFAX 101B and the ADPT 100B is terminated.

After the connection with the IFAX 101B is terminated, the HTTP processor 402 at the ADPT 100B transmits a response signal "POST" to the ADPT 100A (ST616).

When the HTTP processor 402 receives the above "POST" at the ADPT 100A (ST617), the SMTP/POP3 processor 401 outputs "250" as a response signal toward the IFAX 101A, for the completion of the e-mail data transmission as described above (ST618). Further, by exchanging the command signal (QUIT) that announces the completion of the communication path usage and the response signal "221" in response to "QUIT", with the IFAX 101A of the sending side, the connection between the IFAX 101A and the ADPT 100A is terminated. As a result, the connection established between the ADPT 100A and the ADPT 100B is terminated.

Accordingly, the series of the process for transmitting e-mail from the IFAX 101A of the sending side to the IFAX 101B of the receiving side is complete.

According to the ADPT 100 of the embodiment of the present invention, when transmitting e-mail from the IFAX 101A of the sending side to the IFAX 101B of the receiving side, the SMTP protocol is used for the various signal communication and e-mail data communication with the IFAX 101A. However, the HTTP protocol is used for the various signal communication and e-mail data communication with the ADPT 100 to which the IFAX of the other side is connected. Therefore, even on the groupware network 103 that performs communication according to the HTTP protocol, it is possible for the IFAX 101 to normally perform e-mail communication operation.

In the embodiment of the present invention, e-mail communication between the IFAX 101A and the IFAX 101B that are connected to one groupware network is illustrated. However, this invention is not limited to the above embodiment, and it is possible to achieve the same effect as in the embodiment, when the invention is applied to e-mail communication between IFAX units that are connected to individual groupware networks 103 via internet.

Furthermore, the ADPT 100 of the present invention processes e-mail data communication entirely according to the SMTP protocol. Therefore, when the IFAX 101 that is connected to the ADPT 100 performs e-mail reception operation, according the POP3 protocol, the ADPT 100 notifies the IFAX 101 that there is no received e-mail.

Figure 11:
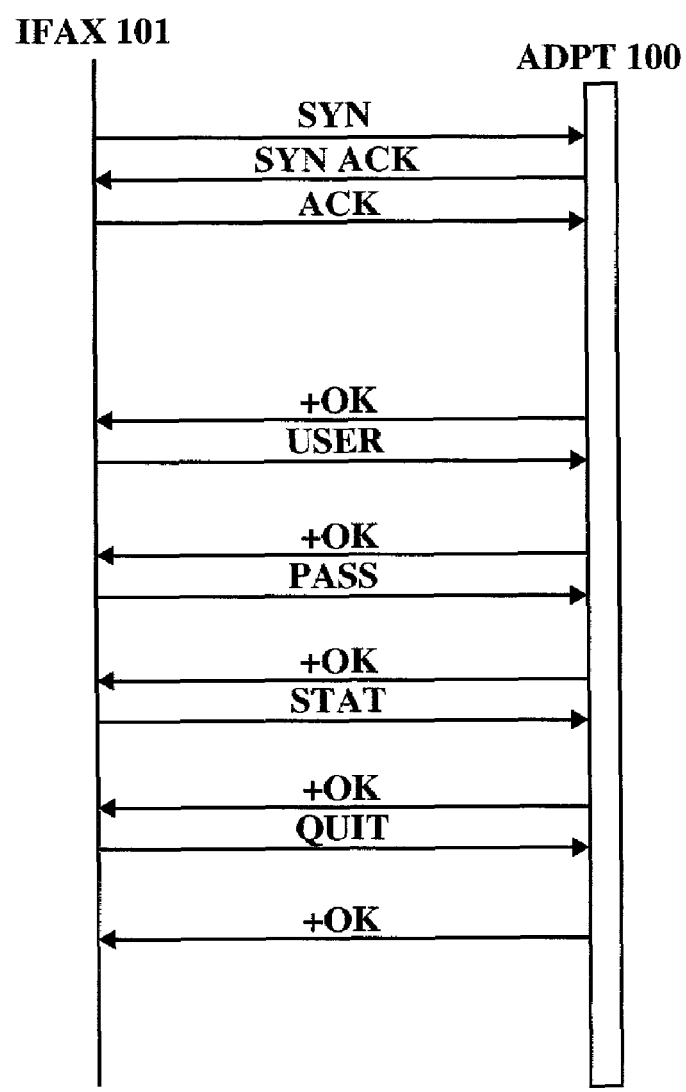
FIG. 11 is a sequence chart illustrating a situation when a connected IFAX receives e-mail using the communication control apparatus according to the embodiment of the present invention.

The process of the ADPT 100, when the IFAX 101 that is connected to the ADPT 100 performs an e-mail reception operation, is illustrated. FIG. 11 is a sequence chart illustrating a process of the ADPT 100, when the IFAX 101 that is connected to the ADPT 100 performs an e-mail reception operation.

When the IFAX 101 is to execute an e-mail reception process, the IFAX 101 also executes the steps to establish a connection with the ADPT 100, which is similar to the situation for transmitting e-mail.

After the connection is established between the IFAX 101 and the ADPT 100, the SMTP/POP3 processor 401 at the ADPT 100 starts an exchange of command signals with the IFAX 101, according to the POP3 protocol. Specifically, the SMTP/POP3 processor 401 first outputs an OK response that indicates a positive response toward the IFAX 101.

Upon receiving this OK response, the IFAX 101 outputs a command signal (USER) for mailbox name transmission toward the ADPT 100. Upon receiving "USER", the signal type moderator 400 at the ADPT 100 notifies the SMTP/POP3 processor 401 of the receipt. Upon receiving the notification, the SMTP/POP3 processor 401 outputs an OK response that indicates a positive response toward the IFAX 101.

Afterwards, the SMTP/POP3 processor 401 receives a command signals: (PASS) for transmission of the mailbox/password output from the IFAX 101; and (STAT) for an inquiry of the reception status. In response to each command signal, the SMTP/POP3 processor 401 outputs an OK response as a positive response toward the IFAX 101.

Upon receiving the "STAT", the OK response that is output toward the IFAX 101 includes a number of e-mail items and size of the each e-mail data, if there is any received e-mail. The ADPT 100 deliberately outputs a message that there is no received e-mail, which is attaching to this OK response.

Upon receiving the OK response, the IFAX 101 transmits a command signal (QUIT) for a notification of the process completion.

The ADPT 100, upon receiving "QUIT", outputs an OK response as a positive response, in response to "QUIT".

Therefore, the connection established between the IFAX 101 and the ADPT 100 is terminated.

Likewise, according to the ADPT 100 of the embodiment of the present invention, when the IFAX 101 performs e-mail reception operation, according the POP3 protocol, the ADPT 100 notifies the IFAX 101 that there is no received e-mail. Therefore, it is possible to surely avoid a situation when the ADPT 100 responds to the request of the IFAX 101 and fails to function properly.

The present invention is not limited to the above-described embodiments, and various variations and modifications may be possible without departing from the scope of the present invention.

This application is based on the Japanese Patent Application No. 2001-197186 filed on Jun. 28, 2001, entire content of which is expressly incorporated by reference herein.

What is claimed is:

1. A communication control apparatus, comprising:
   a first communicator configured to be connected to a network;
   a second communicator configured to be connected to a receiving Internet facsimile apparatus, the receiving Internet facsimile apparatus receiving, from a transmitter via the communication control apparatus, an e-mail to which image data is attached and printing the image data attached to the received e-mail; and
   a controller configured to:
   receive, from the transmitter via the first communicator, URL data according to a HTTP protocol while performing preparatory operations for a mail transmission according to a SMTP protocol via the second communicator;
   convert the received URL data into an e-mail address of the receiving Internet facsimile apparatus;
   receive, from the transmitter via the first communicator, HTML data according to the HTTP protocol;
   convert the received HTML data into e-mail data; and
   transmit to the receiving Internet facsimile apparatus, via the second communicator, the converted e-mail data, based on the e-mail address according to the SMTP protocol when the preparatory operations for the mail transmission are completed.

2. The communication control apparatus according to claim 1, wherein the controller converts the URL data to the e-mail address of the receiving Internet facsimile apparatus by deleting a "HTTP://" in the received URL and converting a dot in the received URL into an @ mark.

3. A communication control method using a communication control apparatus, the communication control apparatus being connected to a receiving Internet facsimile apparatus, the receiving Internet facsimile apparatus receiving, from a transmitter, an e-mail to which image data is attached and printing the image data attached to the received e-mail, the communication control method comprising:
   receiving, from a transmitter, URL data according to a HTTP protocol while performing preparatory operations for a mail transmission according to a SMTP protocol;
   converting the received URL data into an e-mail address of the receiving Internet facsimile apparatus;
   receiving, from the transmitter, HTML data according to the HTTP protocol;
   converting the received HTML data into e-mail data; and
   transmitting, to the receiving Internet facsimile apparatus, the converted e-mail data, based on the e-mail address, according to the SMTP protocol when the preparatory operations for the mail transmission are completed.

* * * * *